United States Patent
Thomas et al.

(10) Patent No.: US 8,222,764 B2
(45) Date of Patent: Jul. 17, 2012

(54) METHOD AND DEVICE FOR REGULATING A RESONANT INVERTER EQUIPPED WITH SUCH A DEVICE

(75) Inventors: Philippe Thomas, Rungis (FR); Jean-Michel Jarrousse, Dissay (FR); Eric Laboure, Cachan (FR)

(73) Assignee: Thales, Neuilly sur Seine (FR)

( * ) Notice: Subject to any disclaimer, the term of this patent is extended or adjusted under 35 U.S.C. 154(b) by 557 days.

(21) Appl. No.: 12/374,453

(22) PCT Filed: Jun. 22, 2007

(86) PCT No.: PCT/EP2007/056283
§ 371 (c)(1),
(2), (4) Date: Sep. 21, 2009

(87) PCT Pub. No.: WO2008/009538
PCT Pub. Date: Jan. 24, 2008

(65) Prior Publication Data
US 2010/0226150 A1    Sep. 9, 2010

(30) Foreign Application Priority Data
Jul. 18, 2006    (FR) .................................. 06 06533

(51) Int. Cl.
*H02J 1/00*    (2006.01)
(52) U.S. Cl. .................................................... 307/32
(58) Field of Classification Search ................... 307/82, 307/32, 33
See application file for complete search history.

(56) References Cited

U.S. PATENT DOCUMENTS

| | | | |
|---|---|---|---|
| 5,416,488 A | 5/1995 | Grover et al. | |
| 7,420,825 B2 * | 9/2008 | Vinciarelli | 363/65 |
| 2008/0310204 A1 | 12/2008 | Thomas et al. | |

FOREIGN PATENT DOCUMENTS
EP    1548922    6/2005
* cited by examiner

Primary Examiner — Shawn Riley
(74) Attorney, Agent, or Firm — Stroock & Stroock & Lavan LLP (57) ABSTRACT

Embodiments of the present invention relate to a method and device for regulating a series resonant inverter with controlled rectification. It also relates to a resonant inverter equipped with such a device. The synchronous series resonant inverter includes a primary winding having across its terminals a periodic voltage V(t) of period T, this primary winding being coupled to at least one secondary winding providing the output voltage Vs. The establishment of the current $I_T(t)$ in the secondary winding is controlled within the period T. The output voltage Vs is regulated as a function of the phase shift angle δ between the zero crossing of the voltage V(t) across the terminals of the primary winding and the instant of establishment of the current $I_T(t)$ in the secondary winding. Embodiments include the production of isolated switched power supplies having a high level of integration, operating at a switching frequency of several megahertz.

11 Claims, 5 Drawing Sheets

METHOD AND DEVICE FOR REGULATING A RESONANT INVERTER EQUIPPED WITH SUCH A DEVICE

The present application is the U.S. National Phase of International Patent Application Serial No. PCT/EP2007/056283, filed Jun. 22, 2007, which claims the benefit of French Patent Application Serial No. 06/06533, filed Jul. 18, 2006, both of which are hereby incorporated by reference in their entireties.

The present invention relates to a method and a device for regulating a series resonant inverter with controlled rectification. It also relates to a resonant inverter equipped with such a device. The invention applies notably for the production of isolated switched power supplies having a high level of integration, operating at a switching frequency of several megahertz.

The electrical power supply devices of electronic circuits occupy a greater or lesser volume. For certain applications, notably airborne, it is desirable to reduce the volume of the electrical power supplies to the maximum.

A solution for reducing the volume occupied by electrical power supplies is to use power supplies based on converters with high switching frequency. Specifically, the integration of converters with high energy density generally leads to the envisaging of high switching frequencies to reduce the volume of the passive components that store the energy, such as inductors, transformers or capacitors. Nevertheless, increasing the switching frequency necessitates the use of structures exhibiting few switching losses since these losses increase with frequency. A known solution for reducing these losses, while retaining a high frequency, is to carry out so-called soft switchings. In these switchings, when a current is switched in a component, such as a transistor for example, the component is controlled although the voltage across its terminals is zero or almost zero (Zero Voltage Switching, ZVS mode). The product current×voltage, the loss factor, is thus reduced during switchings. To carry out these soft switchings, it is desirable to use circuits for aiding switching which are known. However, the rise in frequency makes it difficult to manage the dead times and the numerous phases of the circuits for aiding switching.

Under these conditions, the best candidates for high frequencies are resonant or quasi-resonant inverters. These converters actually work naturally by soft or almost soft switching. Nevertheless, when the frequency at which they operate rises, for example beyond one megahertz, these converters also exhibit not inconsiderable losses which limit the operating frequency and therefore the reduction in volume.

The subject of the invention is a method for regulating the output voltage Vs of a synchronous series resonant inverter comprising a primary winding having across its terminals a periodic voltage V(t) of period T, this primary winding being coupled to at least one secondary winding providing the output voltage Vs. The establishment of the current $I_T(t)$ in the secondary winding being controlled within the period T, the output voltage Vs is regulated as a function of the phase shift angle δ between the zero crossing of the voltage V(t) across the terminals of the primary winding and the instant of establishment of the current $I_T(t)$ in the secondary winding.

In a mode of implementation, the output voltage Vs is slaved to a given setpoint value by a regulating loop of which an input parameter is the phase shift angle δ.

More particularly, the voltage V(t) across the terminals of the primary winding being for example dependent on the on state of a primary switch coupled to this winding and the establishment of the current $I_T(t)$ of the secondary winding being dependent on the on state of a secondary switch coupled to this winding, the on state of the secondary switch is then phase-shifted by the phase shift angle δ with respect to the on state of the primary switch.

Advantageously, the period T is for example variable.

Embodiments of the invention also relate to a device for regulating the output voltage Vs of a synchronous series resonant inverter comprising a primary winding having across its terminals a periodic voltage V(t) of period T, this primary winding being coupled to at least one secondary winding providing the output voltage Vs. The establishment of the current $I_T(t)$ in the secondary winding being controlled within the period T, the device includes a regulating loop slaving the output voltage Vs to a given setpoint value as a function of the phase shift angle δ between the zero crossing of the voltage V(t) across the terminals of the primary winding and the instant of establishment of the current $I_T(t)$ in the secondary winding.

In an embodiment, the establishment of the current $I_T(t)$ of the secondary winding being dependent on the on state of a secondary switch coupled to this winding, the device includes a circuit for generating the control signal for the switch, this control signal being shifted by the phase shift angle δ with respect to the zero crossing of the voltage V(t).

The state of the current $I_T(t)$ of the secondary winding being for example dependent on the on state of a second secondary switch, the device then includes a second circuit for generating the control signal for this second switch substantially shifted by 90° with respect to the previous control signal.

In the case where the switches are field-effect transistors, a control signal provides for example the gate voltage of the transistors.

Embodiments of the invention also relate to a synchronous series resonant inverter comprising:
  a primary part comprising a primary winding having across its terminals a periodic voltage V(t) of period T;
  and at least one secondary part having at least one secondary winding coupled to the primary winding, the current $I_T(t)$ in the secondary winding charging a capacitor across whose terminals the output voltage Vs is provided;

the establishment of the current $I_T(t)$ in the secondary winding being controlled within the period T, the inverter includes a control circuit producing a regulating loop which slaves the output voltage Vs to a given setpoint value as a function of the phase shift angle δ between the zero crossing of the voltage V(t) across the terminals of the primary winding and the instant of establishment of the current $I_T(t)$ in the secondary winding.

The inverter comprising switches (M1, M2) in the secondary part and the establishment of the current in a secondary winding being dependent on the on state of at least one switch, the control circuit includes for example a circuit for generating the control signal for the switch, the said control signal being shifted by the phase shift angle δ with respect to the zero crossing of the voltage V(t).

The control circuit includes for example a second circuit for generating the control signal for a second switch substantially shifted by 90° with respect to the previous control signal.

Embodiments of the invention have the main advantages that it facilitates the implementation of the regulation of inverters and that it accommodates several types of synchronous series inverters.

Other characteristics and advantages of the embodiments will become apparent with the aid of the description which follows offered in relation to appended drawings which represent.

an exemplary controlled synchronous inverter.

an illustration of the control principle for a synchronous inverter according to an embodiment of the invention.

Figure 1A:
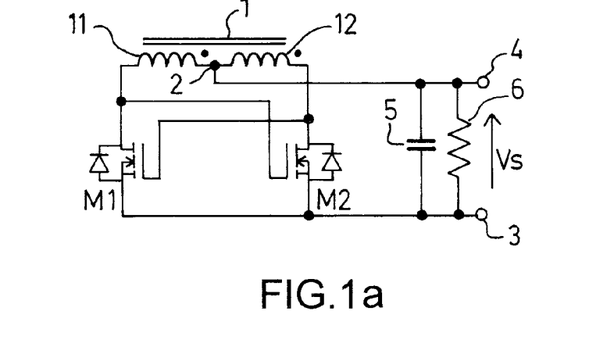
FIGS. 1a, 1b and 1c, examples of secondary parts of synchronous series inverters.

FIG. 1a presents through an electrical diagram an exemplary resonant inverter, of series type. This inverter delivers as output a voltage Vs, for example a low voltage, to supply electronic circuits. It may notably be intended to supply a set of digital processing cards. In this case, it delivers a significant power, that is to say a large current.

More particularly, this figure presents the components situated at the secondary of a transformer, the primary part being moreover known. The use of a transformer makes it possible notably to create a supply voltage isolated from the power source, situated at the primary.

The diagram of FIG. 1a therefore includes the secondary part 1 of a transformer. This part 1 is composed of two windings 11, 12 separated by a midpoint 2. The rectification of the voltage at the secondary of the transformer is carried out by semiconductor switches. Preferably this rectification is for example carried out by field-effect transistors M1, M2. Specifically, the use of diodes for low-voltage high-current applications is not conceivable, since this solution would generate excessive losses within the rectification.

A first transistor M1, represented with its protection diode connected anti-parallel fashion, has its source connected to the gate of the second transistor M2, likewise represented with its diode, and to the opposite input of the first winding 11 from the midpoint 2. The drain of the first transistor M1 is linked to the drain of the second transistor M2, these two drains being linked to an output terminal 3 of the inverter. The gate of the first transistor M1 is linked to the source of the second transistor M2 and to the opposite input of the second winding 12 from the midpoint 2. The connections of the two transistors M1, M2 with respect to the two secondary windings 11, 12 of the transformer are therefore symmetric. The midpoint 2 is linked to the other output terminal 4. A capacitor 5 is linked between the terminals 3, 4 of the output. A resistor 6 of minimal load can also be connected between these terminals 3, 4 where the voltage Vs is present.

The type of rectification illustrated by FIG. 1a is known by the name synchronous rectification, more particularly autocontrolled synchronous rectification.

This solution is simple to implement since it does not require any control circuit for the transistors. Control is actually effected automatically because of the previously described mode of connection. This solution seems satisfactory for frequencies of the order of 100 kHz but is not so for frequencies of the order of 1 MHz because of the losses during switching which occur in the transistors. Specifically, the first transistor M1 is connected in parallel with the gate of the second transistor M2, on the first winding 11. Likewise, the second transistor M2 is connected in parallel with the gate of the first transistor M1, on the second winding 12. At each switching, the energy stored in the drain-source capacitance of the transistor M1 and in the gate-source capacitance of M2 is therefore dissipated. The same holds for the energy stored in the drain-source capacitance of the transistor M2 and in the gate-source capacitance of M1. This energy dissipated twice per period gives rise to losses which are no longer negligible at very high frequencies.

Figure 1B:
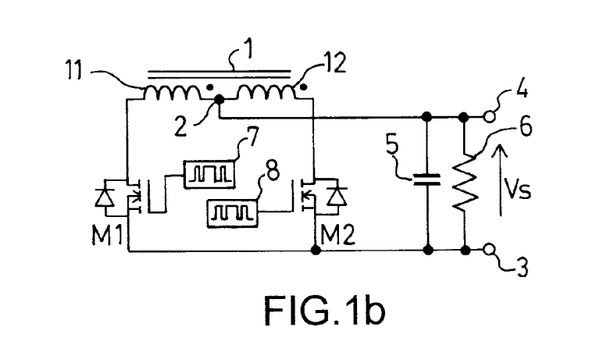

The circuit illustrated by FIG. 1b makes it possible to reduce these losses. This circuit is known as controlled synchronous rectification. The components are the same as in the circuit of FIG. 1a but the transistors M1, M2 are connected differently. In particular, the gates of the transistors M1, M2 are no longer connected to the windings 11, 12 of the transformer but to control circuits 7, 8. The switching of the transistors is controlled by these control circuits 7, 8. The choice of a controlled synchronous rectification allows adjustment of the power at the secondary of the transformer. This adjustment is obtained by altering the phase shift of the rectification, this phase shift being controlled by the circuits 7, 8.

Controlled synchronous rectification allows notably:
adjustment of the power of the converters at resonance while maintaining a fixed switching frequency;
minimization of the rectification losses through the use of close control with charge recovery;
minimization of the number of power breakers for a converter with bidirectional power transfer, while maintaining for these breakers so-called soft switchings, desirable for the rise in frequency.

Figure 1C:
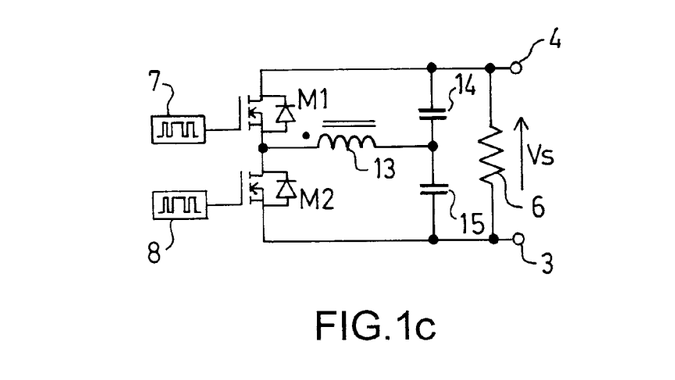

FIG. 1c represents a resonant inverter of controlled synchronous type, with capacitive midpoint. In this case the secondary part includes a single winding 13, one end of which is linked between the two transistors M1, M2 and the other end of which is linked between two capacitors 14, 15, each of these capacitors being additionally linked to one of the transistors M1, M2. A resistor 6 is connected in parallel with the two capacitors 14, 15. The output of the inverter being defined by the terminals 3, 4 of this resistor. The transistors M1, M2 are still controlled by the control circuits 7, 8.

Figure 2:
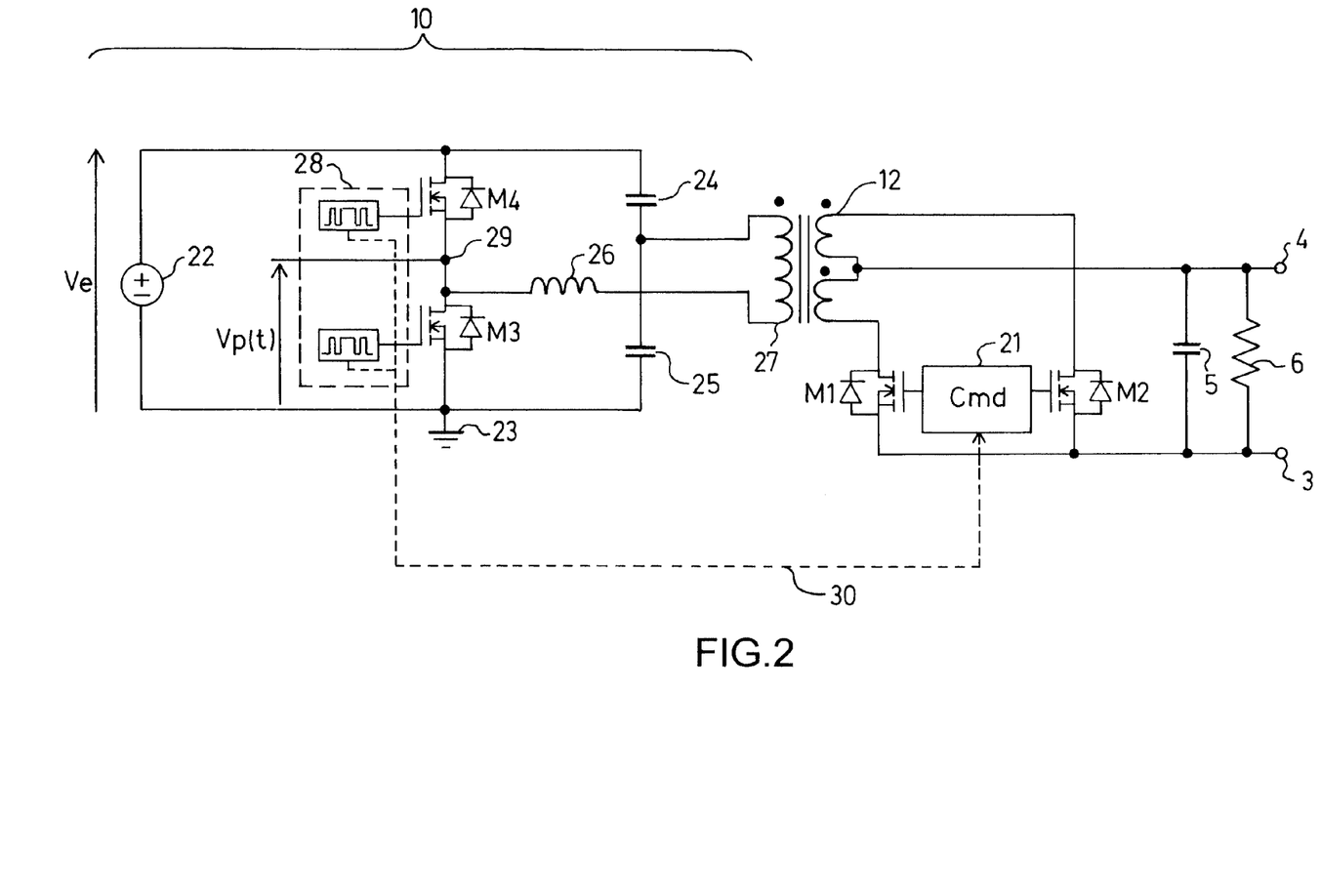
FIG. 2 illustrates an embodiment resonant power supply.

FIG. 2 presents an exemplary resonant power supply with one of the two controlled synchronous rectifications. The secondary part of the transformer 20 is analogous to that of FIG. 1b, the control circuits 7, 8 of the transistors having been grouped together in a single control circuit 21.

The primary part 10 includes a power supply source 22 delivering at input a voltage Ve. This source 22 is connected between a reference potential 23, for example the mechanical ground, and a first capacitor 24, being linked to a second capacitor 25 and to an inductor 26. The second capacitor 25 is additionally linked to the reference potential 23. The inductor 26 is linked to an access of the primary winding 27 of the transformer. A first transistor M3 is connected between the reference potential 23 and the other access of the primary winding 27. A second transistor M4 is connected, between series with the first M3, on the first capacitor 24. A voltage Vp(t) is created between the midpoint 29 of the bridge arm composed of the transistors M3, M4 and the reference potential 23. The voltage Vp(t) is the voltage across the terminals of the transistor M3.

A circuit 28 controls the switching of the transistors M3, M4. This control is of the unslaved type. It controls the primary transistors M3, M4 according to a fixed duration and more particularly according to a fixed shape factor equal to ½ for each of the transistors, one being on when the other is off and vice versa. Regulation is done at the level of the control 7, 8, 21 of the secondary transistors M1, M2. The regulation alters the duration of control of each of these transistors so as to slave the output voltage Vs to a given voltage setpoint.

Figure 3:
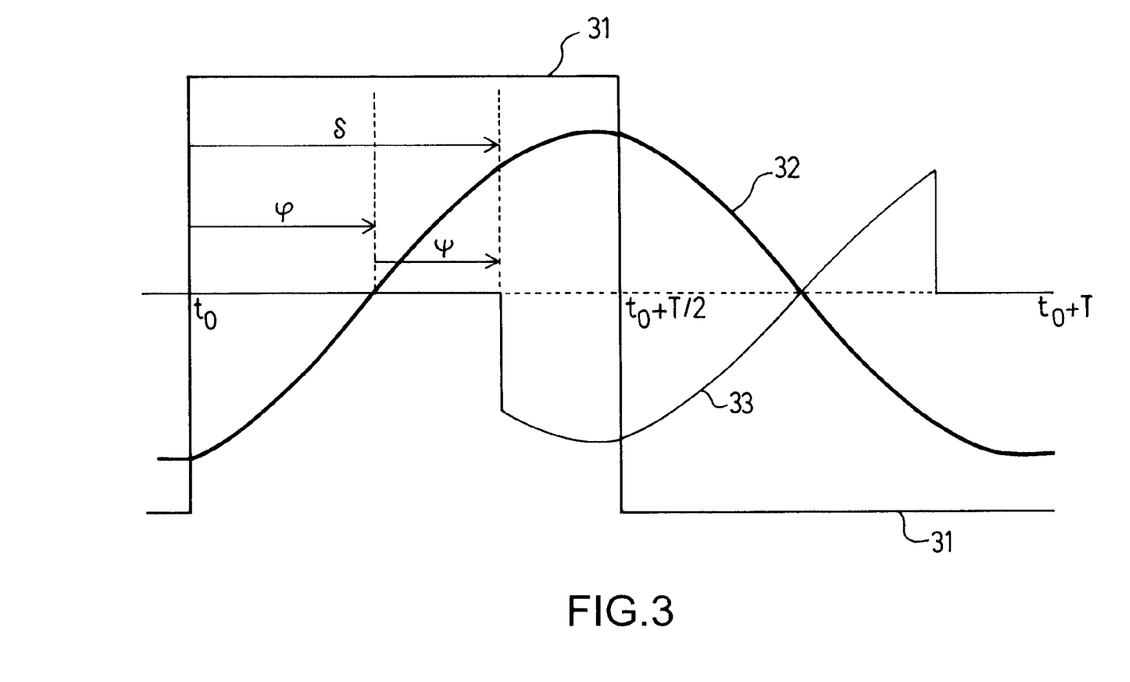
FIG. 3 illustrates phase shifts between certain power and control signals for transistors at a secondary of an inverter.

The synchronous rectification illustrated by the circuit of FIG. 2 makes it possible to adjust the output voltage Vs by shifting the control of the secondary transistors M1, M2, that is to say the establishment of the secondary current, with respect to the primary current, also called the resonant current. Under these conditions, the switching frequency of the primary transistors M3, M4 can therefore be fixed, with shape factor ½ while preserving quasi-resonant operation. At the secondary, the shift of the control for establishing the current makes it possible to modulate the mean current injected into the filtering capacitor 5 at the output terminals and therefore the output voltage Vs. FIG. 3 illustrates the principle of output regulation of a series resonant inverter according to an embodiment of the invention, by controlling the establishment of current at the secondary of the inverter. The embodiment applies notably to circuits of controlled synchronous type, for example circuits having secondary parts of the type of FIGS. 1b or 1c. More particularly FIG. 3 illustrates the phase shifts between the various power and control signals for the transistors at the secondary of the inverter.

A first curve 31 represents the voltage V(t) as a function of time across the terminals of the primary winding 27, and therefore across the terminals of the secondary windings 11, 12, 13 in the transformation ratios. This voltage is dependent on the state, on or off, of the primary transistors M3, M4. It is of square shape, that is to say it has a substantially constant value+V during a first half-period, between a time to and a time $t_0+T/2$, when a first transistor M3 is on. It is at a substantially constant value, but opposite to the previoUs one, −V, during the other half-period, between $t_0+T/2$ and $t_0+T$, when the second transistor M4 is on. The form of the primary voltage thus follows the control of the transistors M3, M4.

A second curve 32 represents the current I(t) as a function of time in the primary winding 27. This current is of sinusoidal form, it is generally called resonant or quasi-resonant current. This current I(t) is phase-shifted by an angle $\phi$ with respect to the voltage V(t) across the terminals of the primary winding or of the secondary windings, that is to say its value I(t) notably crosses zero an angle $\phi$ after the zero crossing of the voltage V(t). In the case of the voltage V(t), the zero crossing in fact corresponds here to the crossover from a constant negative value to a constant positive value. The delay of the primary current I(t) relative to the voltage V(t) can be expressed in terms of angular shift or phase shift $\phi$. It can also be expressed as a time shift $\Delta t$ with $\Delta t/T = \phi/2\pi$, $\phi$ being expressed in radians. Expressing the shift in terms of phase shift makes it possible to circumvent the duration of the period T of the voltage or of the current.

A third curve 33 represents the current $I_T(t)$ passing through one of the secondary transistors M1, M2. The two transistors operate in a complementary manner, that is to say when one transistor is on the other is off and vice-versa. By referring for example to FIG. 1b, the current $I_T(t)$ illustrated in FIG. 3 represents the current in the transistor M1 and the voltage V(t) represents the voltage across the terminals of the first winding 11.

According to the prior art, the transistor M1 is turned on with a phase shift ψ with respect to the zero crossing of the current I(t) at the primary, represented by the second curve 32. In this case, the voltage adjustment is made by acting on the value of this angle ψ.

According to an embodiment of the invention, the primary transistors are not controlled according to this angle ψ but by acting on the angle δ, no longer counted with respect to the zero crossing of the primary current I(t) but with respect to the zero crossing of the voltage V(t) across the terminals of the primary, or secondary, winding. In other words, the reference of the phase shift is no longer the crossing through zero of the primary current but the crossing through zero of the primary voltage. This crossing through zero corresponds to a change of sign of the voltage V(t). In the case of a square shape voltage such as illustrated by curve 31, this corresponds to the crossover from the value −V to the value +V. This crossover corresponds to the zero crossing of the Vp(t) at the midpoint 29 of the bridge arm composed of the primary transistors M3, M4. In practice the angle δ can therefore be determined between the zero crossing of the voltage Vp(t) and the order of control of rectification of the transistors M1, M2 determining the instant of establishment of the current $I_T(t)$. The angle δ can thus be simply defined between the turning on of the primary transistor M3 and the turning on of the secondary transistor M1 or of the secondary transistor M2.

Thus, the establishment of the current $I_T(t)$ in a secondary winding being controlled inside the aforesaid period T, the output voltage Vs is regulated as a function of the phase shift angle δ between the zero crossing of the voltage V(t) across the terminals of the primary winding and the instant of establishment of the current $I_T(t)$ in the secondary winding.

More particularly, in the example of FIG. 3, the adjustment is therefore made as a function of the phase shift δ with respect to the change of value of the voltage wave V(t), i.e. with respect to the instant $t_0$ of the start of the period T. A simple relation can then be obtained between this phase shift angle δ and the output voltage Vs, i.e.:

$$Vs = k \cdot \sin(\delta) \quad (1)$$

k being a constant depending on the inverter and its environment.

FIG. 3 illustrates the control of a transistor, for example the transistor M1, coupled to a first secondary winding 11. The control at the level of the other transistor coupled with respect to the second winding, for example the transistor M2 is analogous. More particularly, the phase shift δ applied for the control of the first transistor M1 is also applied for the second transistor M2 with respect to the establishment of the voltage V(t), applied to the terminals of the secondary winding to which it is coupled. If a single secondary winding 13 is coupled to the two transistors as in the case of the circuit of FIG. 1c, this also applies. In all cases, the controls between the two transistors are shifted by 90°.

By convention, the voltage across the terminals of the primary winding and across the terminals of the secondary winding is called V(t). Nevertheless, the voltage across the terminals of the secondary winding may be equal to the voltage across the terminals of the primary winding but also vary in a given transformation ratio.

Figure 4A:
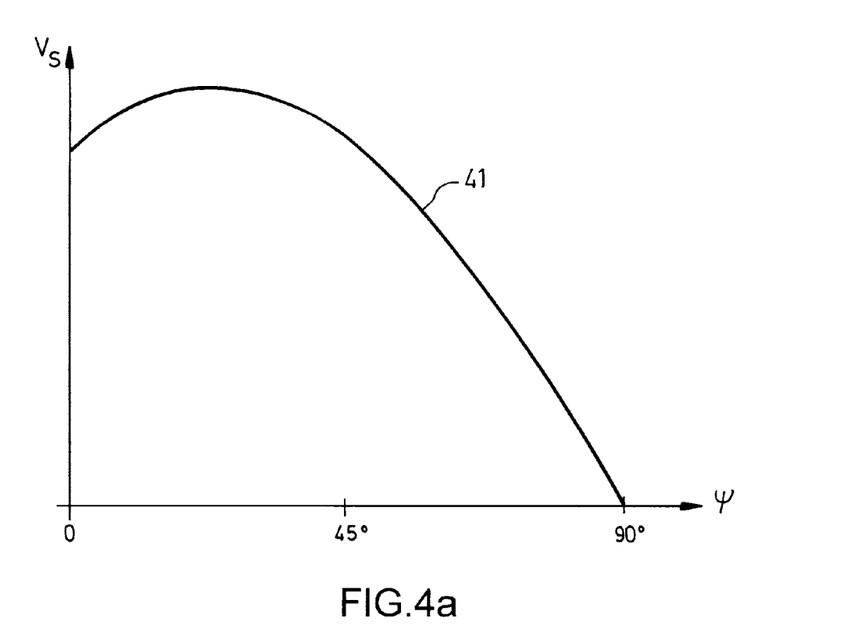
FIGS. 4a and 4b, examples of transfer functions for regulation controls according to the prior art and according to an embodiment of the invention respectively.
Figure 4B:
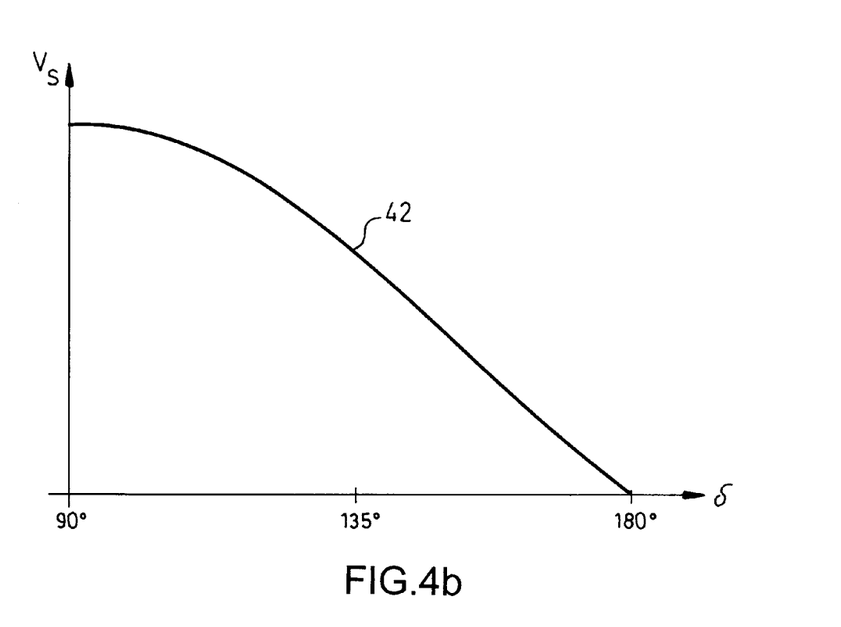

FIGS. 4a and 4b illustrate an advantage afforded by the method according to an embodiment of the invention. FIG. 4a illustrates by a curve 41 the transfer function according to the prior art, that is to say the transfer function between the phase shift angle ψ and the output voltage Vs of the inverter. The angle ψ varies between 0 and 45°. Curve 41 exhibits a vertex 411. Between the angle 0° and this vertex, the output voltage Vs increases then decreases from the vertex up to the maximum phase shift angle 90°.

FIG. 4b illustrates by a curve 42 the transfer function relating the phase shift angle δ used by the method according to an embodiment of the invention and the output voltage Vs. The output voltage Vs is slaved to a given setpoint value by a regulating loop, installed for example in the control circuit 21 in the case of the circuit of FIG. 2. The phase shift angle δ is an input parameter, for example the only one, of this regulating loop whose transfer function is represented by the curve 42 of FIG. 4b. Advantageously, this curve 42 is monotonic. The output voltage Vs decreases from the phase shift angle of 90° up to the phase shift angle of 180°. The curve 42 of FIG. 4b represents the voltage Vs as a function of the angle δ as defined by relation (1).

The fact that the transfer function is monotonic allows simpler slaving. In particular, the maximum output value is always obtained for the same value of δ, unlike the other types of controls, notably that illustrated by FIG. 4a where the maximum voltage value, defined by the vertex 411 of the curve 41, corresponds to an angle value ψ which varies from one inverter to another.

Figure 5:
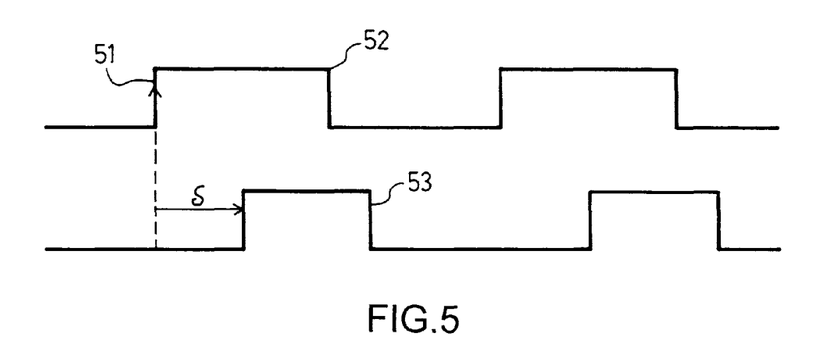
FIG. 5, a possible exemplary embodiment of a regulation control according to an embodiment of the invention.

Another advantage of embodiments of the invention is that they are simple to implement. In particular, the phase shift δ is easy to obtain. It can be obtained simply by reference to the control of the voltage V(t) of the primary winding. More precisely, the phase shift δ can be calculated on the basis of the rising edge 51 of the signal controlling the voltage V(t) across the terminals of the primary winding as illustrated by FIG. 5. In this figure, a first curve 52 illustrates the control signal for the voltage V(t) across the terminals of the primary winding. In practice, this signal 52 is for example a gate voltage applied to one of the transistors M3, M4 of the primary, this gate voltage controlling the transistor to the on state. The on state of one or of the other of the transistors M3, M4 controls on its side the voltage V(t) in one direction or in the other across the terminals of the primary winding 27. A second curve 53 represents the signal controlling establishment in one of the secondary windings 11, 12, 13. In practice, this signal is for example a gate voltage applied to one of the secondary transistors M1, M2. The two signals are shifted by the angle δ serving as parameter for regulating the output voltage Vs of the inverter. In other words the on state of a secondary transistor, M1 or M2, is phase-shifted by the phase shift angle δ with respect to the on state of a primary switch, M3 or M4.

Embodiments of the invention have been described with switches embodied as field-effect transistors. Other types of switches can be used. A regulating device according to the embodiments includes a regulating loop, for example installed in the control circuit 21 of the inverter presented by FIG. 2. This regulating loop slaves the output voltage Vs to the given setpoint value as a function of the phase shift. angle δ. The regulating device generates for example the control signals for the transistors M1, M2 such as illustrated by curve 42 of FIG. 4b.

Figure 6:
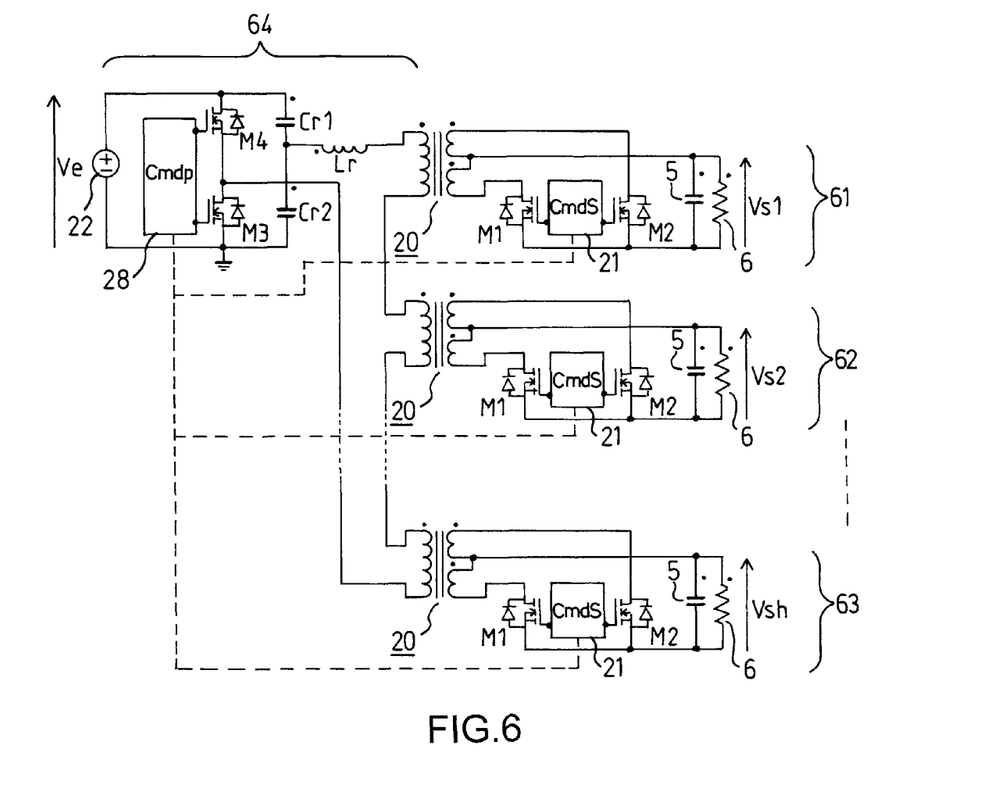
FIG. 6, a possible exemplary embodiment of an inverter according to an embodiment of the invention delivering several isolated output voltages.

In the case of a converter with several secondary parts 61, 62, 63 each delivering an output voltage, such as illustrated by FIG. 6, the whole regulation can be done readily at the level of each secondary. The regulation at the level of each secondary can be done by a signal 53 as described previously, with a phase shift δ with respect to the control signal 52 for the primary voltage. This allows notably:

- very fast regulation of the output voltage Vs1, Vs2, ... Vsn of each secondary, since it does not use the transmission of analogue information from the secondary to the primary, or from the primary to the secondary;
- the realization of several secondary voltages isolated from one another and independently regulated by using the same primary resonant circuit 64.

An inverter with several outputs, such as illustrated by FIG. 6, minimizes the number of power breakers for achieving several independently isolated and regulated voltages, while preserving the advantages of soft switching for all the breakers. The reversibility of the power transfer and very fast regulation are also ensured since the regulation is achieved entirely at the secondaries of the power transformers.

The invention claimed is:

1. A method for regulating an output voltage (Vs) of a synchronous series resonant inverter, comprising the steps of:
   providing a periodic voltage V(t) of a period T across terminals of a primary winding;
   coupling at least one secondary winding to the primary winding, to provide the output voltage and an establishment of a current IT(t) in the secondary winding;
   regulating the output voltage (Vs) as a function of a phase shift angle δ between a zero crossing of the voltage V(t) across the terminals of the primary winding and an instant of establishment of the current IT(t) in the secondary winding, to control the current IT(t) within the period T.

2. The method according to claim 1, further comprising the steps of:
   providing the phase shift angle δ to an input of a regulating loop;
   slaving the output voltage (Vs) to a predetermined setpoint value by use of the regulating loop.

3. The method according to claim 1, wherein:
   the voltage V(t) across the terminals of the primary winding depends on an on state of a primary switch coupled to the primary winding; and
   the establishment of the current IT(t) of the secondary winding depends on an on state of a secondary switch coupled to the secondary winding, wherein the on state of the secondary switch is phase-shifted by the phase shift angle δ with respect to the on state of the primary switch.

4. The method according to claim 1, wherein the period T is variable.

5. A device for regulating an output voltage (Vs) of a synchronous series resonant inverter, the device comprising:
   a primary winding having across its terminals a periodic voltage V(t) of a period T;
   at least one secondary winding coupled to the primary winding, the secondary winding providing the output voltage (Vs), wherein an establishment of a current $I_T(t)$ in the secondary winding is controlled within the period T;
   a regulator loop coupled to the secondary winding to slave the output voltage (Vs) to a setpoint value given as a function of a phase shift angle δ between a zero crossing of the voltage V(t) across the terminals of the primary winding and an instant of establishment of the current $I_T(t)$ in the secondary winding.

6. The device according to claim 5, wherein the establishment of the current $I_T(t)$ of the secondary winding depends on an on state of a first secondary switch (M1) coupled to the secondary winding, the device further comprising:
   a circuit for generating a control signal for the first secondary switch, the control signal for the first secondary switch being shifted by the phase shift angle δ with respect to the zero crossing of the voltage V(t).

7. The device according to claim 6, wherein a state of the current $I_T(t)$ of the secondary winding depends on the on state of a second secondary switch (M2), the device further comprising a second circuit for generating a control signal of this second secondary switch, the control signal for the second secondary switch substantially shifted by 90° with respect to the control signal for the first secondary switch.

8. The device according to claim 7, wherein the first and second secondary switches each comprise a field-effect transistor, wherein the control signals for the first and second secondary switches provide the gate voltages of the respective transistors.

9. A synchronous series resonant inverter comprising:
- a primary part comprising a primary winding having across its terminals a periodic voltage V(t) of a period T; and
- at least one secondary part having at least one secondary winding coupled to the primary winding, a current $I_T(t)$ in the secondary winding charging a capacitor across whose terminals an output voltage (Vs) is provided, wherein an establishment of the current $I_T(t)$ in the secondary winding is controlled within the period T;
- a control circuit coupled to the secondary winding to produce a regulating loop which slaves the output voltage (Vs) to a setpoint value given as a function of a phase shift angle δ between a zero crossing of the voltage V(t) across the terminals of the primary winding and an instant of establishment of the current $I_T(t)$ in the secondary winding.

10. An inverter according to claim 9, comprising at least one switch in the secondary part, the establishment of the current in the secondary winding being dependent on an on state of said at least one switch, wherein the control circuit comprises a circuit for generating a control signal for said at least one switch, the control signal for said at least one switch being shifted by the phase shift angle with respect to the zero crossing of the voltage V(t).

11. The inverter according to claim 10, wherein the control circuit comprises a second circuit for generating the control signal for a second switch substantially shifted by 90° with respect to a control signal for a first switch.

* * * * *